(12) United States Patent
Saito (10) Patent No.: US 9,648,226 B2
(45) Date of Patent: May 9, 2017

(54) IMAGE CAPTURE APPARATUS AND CONTROL METHOD THEREOF

(71) Applicant: CANON KABUSHIKI KAISHA, Tokyo (JP)

(72) Inventor: Junichi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/153,920

(22) Filed: May 13, 2016

(65) Prior Publication Data

US 2016/0344921 A1 Nov. 24, 2016

(30) Foreign Application Priority Data

May 19, 2015 (JP) ................. 2015-102274

(51) Int. Cl.
*H04N 5/232* (2006.01)
*H04N 9/64* (2006.01)
*G02B 7/36* (2006.01)
*H04N 5/235* (2006.01)
*G03B 13/36* (2006.01)

(52) U.S. Cl.
CPC ......... *H04N 5/23212* (2013.01); *G02B 7/365* (2013.01); *G03B 13/36* (2013.01); *H04N 5/2351* (2013.01); *H04N 9/646* (2013.01)

(58) Field of Classification Search
CPC ............. H04N 5/23212; H04N 5/2351; H04N 5/23293; H04N 5/3572; H04N 5/217; H04N 5/232; H04N 5/23245; H04N 5/2355; H04N 5/23209; H04N 1/00039; H04N 1/6005; H04N 1/6027; H04N 9/646; G03B 13/36; G03B 13/34; G02B 7/36; G02B 7/365; G02B 7/34
See application file for complete search history.

(56) References Cited

U.S. PATENT DOCUMENTS

| | | | | |
|---|---|---|---|---|
| 6,163,340 A * | 12/2000 | Yasuda | .................... | G02B 7/36 348/345 |
| 6,480,300 B1 * | 11/2002 | Aoyama | ................. | G06T 5/004 358/1.9 |
| 7,876,375 B2 * | 1/2011 | Takei | ................. | H04N 5/23212 348/345 |
| 9,066,003 B2 * | 6/2015 | Sugimoto | .......... | H04N 5/23212 |
| 9,244,335 B2 | 1/2016 | Itoh | | |

(Continued)

FOREIGN PATENT DOCUMENTS

| JP | H04-015629 A | 1/1992 |
|---|---|---|
| JP | 2001-250931 A | 9/2001 |
| JP | 2014-002197 A | 1/2014 |

*Primary Examiner* — Michael Osinski
(74) *Attorney, Agent, or Firm* — Fitzpatrick, Cella, Harper & Scinto (57) ABSTRACT

An image capture apparatus and control method thereof that improve focus detection accuracy in scenes that have low luminance, contrast, and the like is disclosed. The image capture apparatus has a focus detection mode suited to scenes that have low luminance, contrast, and the like. In this focus detection mode, the focus detection is carried out on the basis of a frequency component extracted from an image signal to which a coefficient for correcting intensity differences between color components is not applied, or to which a coefficient having a lower difference among color components than the computed coefficient has been applied.

17 Claims, 8 Drawing Sheets

(56) References Cited

U.S. PATENT DOCUMENTS

| | | | |
|---|---|---|---|
| 9,300,862 B2 | 3/2016 | Saito et al. | |
| 9,363,429 B2* | 6/2016 | Saito | H04N 5/23219 |
| 9,407,813 B2* | 8/2016 | Hamano | H04N 5/23212 |
| 9,445,067 B2* | 9/2016 | Hirooka | H04N 9/646 |
| 2004/0196401 A1* | 10/2004 | Kikuchi | H04N 5/23212 348/345 |
| 2005/0249488 A1* | 11/2005 | Takei | H04N 5/23212 396/101 |
| 2007/0086767 A1* | 4/2007 | Nakai | G03B 13/34 396/101 |
| 2007/0201858 A1* | 8/2007 | Shiohara | H04N 1/00039 396/310 |
| 2007/0286588 A1* | 12/2007 | Hatano | G03B 17/00 396/88 |
| 2008/0018776 A1* | 1/2008 | Park | H04N 5/23212 348/349 |
| 2008/0252744 A1* | 10/2008 | Suto | G02B 7/365 348/222.1 |
| 2009/0016709 A1* | 1/2009 | Wen | G02B 7/36 396/127 |
| 2011/0052173 A1* | 3/2011 | Yoshida | G03B 7/00 396/213 |
| 2011/0242352 A1* | 10/2011 | Hikosaka | H04N 9/045 348/222.1 |
| 2012/0162496 A1* | 6/2012 | Nishiguchi | H04N 5/23212 348/345 |
| 2013/0135520 A1* | 5/2013 | Sugimoto | H04N 5/23212 348/349 |
| 2013/0335619 A1* | 12/2013 | Itoh | G03B 13/36 348/349 |
| 2014/0118611 A1* | 5/2014 | Hamano | H04N 5/23212 348/350 |
| 2014/0168503 A1* | 6/2014 | Maruyama | H04N 5/23212 348/350 |
| 2014/0333824 A1* | 11/2014 | Xiu | H04N 5/2351 348/353 |
| 2015/0195446 A1* | 7/2015 | Saito | H04N 5/23219 348/353 |
| 2015/0245000 A1* | 8/2015 | Sato | H04N 9/735 348/223.1 |
| 2015/0350527 A1* | 12/2015 | Hamano | H04N 5/23212 348/231.99 |
| 2016/0070098 A1* | 3/2016 | Maruyama | H04N 9/7908 348/345 |
| 2016/0127637 A1* | 5/2016 | Takao | G02B 7/365 348/208.12 |
| 2016/0205309 A1* | 7/2016 | Hamano | H04N 5/23212 348/353 |
| 2016/0234423 A1* | 8/2016 | Miyazawa | H04N 5/232 |

* cited by examiner

IMAGE CAPTURE APPARATUS AND CONTROL METHOD THEREOF

BACKGROUND OF THE INVENTION

Field of the Invention

The present invention relates to image capture apparatuses and control methods thereof, and particularly relates to automatic focus detection (AF) techniques.

Description of the Related Art

Recent image capture apparatuses include automatic focus detection (AF) functions, but there are some scenes that AF functions handle poorly. As such, an image capture apparatus is known in which in the case where a mode has been set for capturing a scene that an AF function handles poorly, such as a starry sky scene, a focus lens is driven to an infinity position set in advance, rather than using the AF function (Japanese Patent Laid-Open No. 4-15629).

However, a configuration that drives a focus lens to a pre-set infinity position cannot handle changes in the infinity position caused by aging, environmental temperature, changes in the camera orientation, and so on, resulting in cases where a well-focused image cannot be obtained.

Japanese Patent Laid-Open No. 2014-2197 proposes reducing a number of pixel additions performed when generating an image for use in AF beyond a number normally used so as to suppress changes in frequency components caused by the pixel addition and improve the accuracy of the AF in the case where a point light source is the dominant subject, such as in a night scene. However, reducing the number of pixel additions also reduces an effect of reducing random noise in dark areas, resulting in a problem where the AF accuracy is easily affected by the random noise.

SUMMARY OF THE INVENTION

Having been achieved in order to improve at least one of such problems with past techniques, the present invention provides an image capture apparatus and a control method thereof that improve focus detection accuracy in scenes that have low luminance, contrast, or the like.

According to one aspect of the present invention, there is provided an image capture apparatus comprising: an obtainment unit configured to obtain an image signal from an image sensor; a computation unit configured to compute a coefficient for correcting an intensity difference between color components of the image signal; an extraction unit configured to extract a specific frequency component from the image signal; and a focus detection unit configured to carry out focus detection on the basis of the extracted specific frequency component, wherein in a first focus detection mode, the extraction unit extracts the specific frequency component from the image signal without applying the coefficient computed by the computation unit or the image signal having applied a coefficient having a smaller difference between color components than the coefficient computed by the computation unit; and in a second focus detection mode, the extraction unit extracts the specific frequency component from the image signal having applied the coefficient computed by the computation unit.

According to another aspect of the present invention, there is provided an image capture apparatus comprising: an obtainment unit configured to obtain an image signal from an image sensor; a computation unit configured to compute a coefficient for correcting an intensity difference between color components of the image signal; an extraction unit configured to extract a specific frequency component from the image signal; and a focus detection unit configured to carry out focus detection on the basis of the extracted specific frequency component, wherein in a first focus detection mode, the extraction unit extracts the specific frequency component from the image signal without applying the coefficient computed by the computation unit or through an operation using the values of pixels of the same color component in the image signal to which a coefficient having a smaller difference between color components than the coefficient computed by the computation unit has been applied.

According to another aspect of the present invention, there is provided a control method for an image capture apparatus, comprising: obtaining an image signal from an image sensor; computing a coefficient for correcting an intensity difference between color components of the image signal; extracting a specific frequency component from the image signal; and carrying out focus detection on the basis of the extracted specific frequency component, wherein the extracting of the specific frequency component from the image signal includes: in a first focus detection mode, extracting the specific frequency component from the image signal without applying the coefficient computed in the step of computing or from the image signal having applied a coefficient having a smaller difference between color components than the coefficient computed in the computing; and in a second focus detection mode, extracting the specific frequency component from the image signal having applied the coefficient computed in the step of computing.

According to a further aspect of the present invention, there is provided a control method for an image capture apparatus, the method comprising: obtaining an image signal from an image sensor; computing a coefficient for correcting an intensity difference between color components of the image signal; extracting a specific frequency component from the image signal; and carrying out focus detection on the basis of the extracted specific frequency component, wherein the extracting of the specific frequency component from the image signal includes extracting the specific frequency component from the image signal without applying the coefficient or through an operation using the values of pixels of the same color component in the image signal to which a coefficient having a smaller difference between color components than the coefficient has been applied.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. The following will describe the present invention as being applied in a digital camera serving as an example of an image capture apparatus. However, the present invention can be applied in any apparatus or device having an image capture function, and while cellular phones, personal computers, tablet terminals, and game consoles are examples of such apparatuses or devices, the present invention is not limited to being applied therein.

Configuration of Digital Camera

Figure 1:
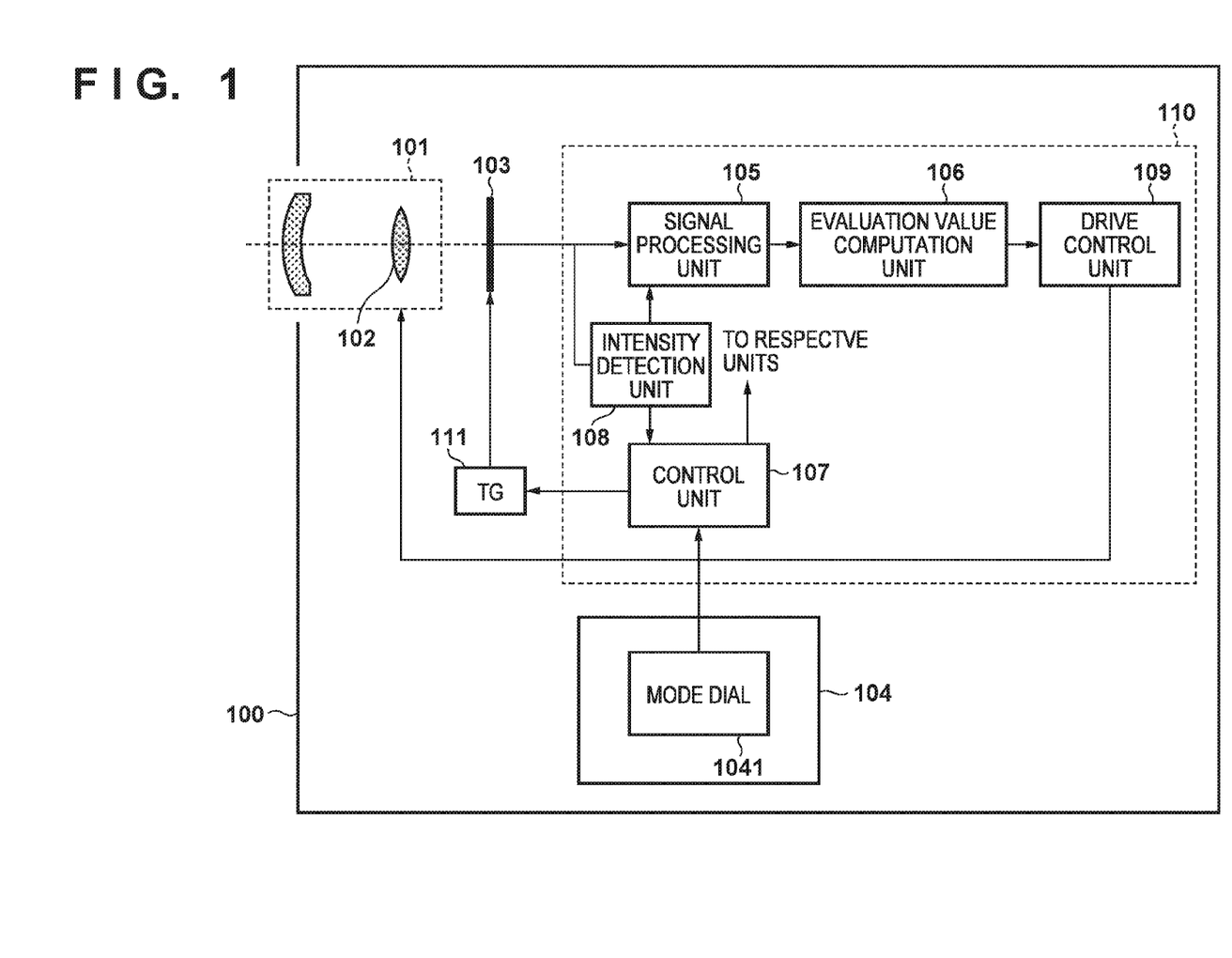
FIG. 1 is a diagram illustrating an example of the configuration of a digital camera serving as an example of an image capture apparatus according to an embodiment.

FIG. 1 is a diagram schematically illustrating an example of the configuration of a digital camera 100 according to an embodiment of the present invention. An optical imaging system 101 includes a magnification lens for changing an angle of view, along with a drive mechanism thereof; a focus lens 102 serving as a focusing optical system, along with a drive mechanism thereof; and a diaphragm, along with a drive mechanism thereof. The optical imaging system 101 may be configured to be removable from the digital camera 100. Incident light from the optical imaging system 101 is converted into an electrical signal (an image signal) by an image sensor 103, which is a CCD or CMOS image sensor. The image signal undergoes A/D conversion and the like and is input into a signal processing unit 105. The signal processing unit 105 generates a luminance signal through a process that will be described later.

It is assumed that in the present embodiment, the image sensor 103 is provided with a color filter having a specific repeating pattern, specifically a color filter having a primary color Bayer pattern. A color filter corresponding to a single color component that constitutes the pattern (red, green, or blue) is assigned to each pixel of the image sensor 103. The following may describe the color of the assigned color filter as the color of the pixel, pixels with the same color of color filter assigned thereto as pixels having the same color or the same color component, and so on.

An intensity detection unit 108 (a computation unit) detects a signal intensity on a color component-by-color component basis, and on the basis thereof, a control unit 107 controls a processing method used by the signal processing unit 105. For example, when a release button is depressed halfway and an instruction to start capturing preparation operations is input, an evaluation value computation unit 106 begins computing an AF evaluation value used in contrast-based AF on the basis of the luminance signal, and the control unit 107 carries out focus detection on the basis of the AF evaluation value. Meanwhile, the control unit 107 carries out AE processing on the basis of the luminance signal generated by the signal processing unit 105. The evaluation value computation unit 106 and the control unit 107 constitute a focus detection unit.

An operating unit 104 is an input device group through which a user makes settings, instructions, and so on in the digital camera 100, and includes the release button, a menu button, a directional key, an OK button, a power switch, a touch panel, and the like. States, operations, and the like of the operating unit 104 are input into the control unit 107, and the control unit 107 carries out control for performing operations based on the states, operations, and the like of the operating unit 104.

In the present embodiment, the operating unit 104 includes a mode dial 1041 for setting an image capture mode. As will be described later, the control unit 107 changes the processing performed by the signal processing unit 105, the evaluation value computation unit 106, and the like in accordance with the image capture mode that has been set. The digital camera 100 according to the present embodiment includes a "starry sky image capture mode" as an image capture mode.

A drive control unit 109 obtains the AF evaluation value computed by the evaluation value computation unit 106 while driving the focus lens 102 within a predetermined range, detects a position of the focus lens 102 where the AF evaluation value is highest, and moves the focus lens 102. After the drive control of the focus lens 102 is completed and an instruction to start capturing operations is input by the release button being fully depressed or the like, the control unit 107 executes the capturing operations by controlling a charge accumulation time of the image sensor 103, operations of the diaphragm, and so on. The control unit 107 carries out recording processing, for example, on the captured image, and records the image in a non-volatile recording medium such as a memory card.

A timing signal generation circuit (TG) 111 generates timing signals to be supplied to horizontal and vertical readout circuits and the like of the image sensor 103 in accordance with a readout mode set in the control unit 107. The TG 111 and the control unit 107 constitute an obtainment unit that obtains an image signal from the image sensor 103. As will be described later, the digital camera 100 according to the present embodiment changes the readout mode of the image sensor 103 in accordance with the image capture mode.

Note that the signal processing unit 105, the evaluation value computation unit 106, the control unit 107, the intensity detection unit 108, and the drive control unit 109 may be realized by a programmable processor such as a CPU or an MPU (called simply a "CPU" hereinafter) 110 executing software. Alternatively, one or more of the signal processing unit 105, the evaluation value computation unit 106, the control unit 107, the intensity detection unit 108, and the drive control unit 109 may be constituted by hardware circuits such as ASICs, FPGAs, CPLDs, or the like. The following assumes at least that the control unit 107, which realizes the functions of the digital camera 100 by controlling the respective units, is realized by the CPU 110 executing software.

Outline of AF Processing

Figure 2:
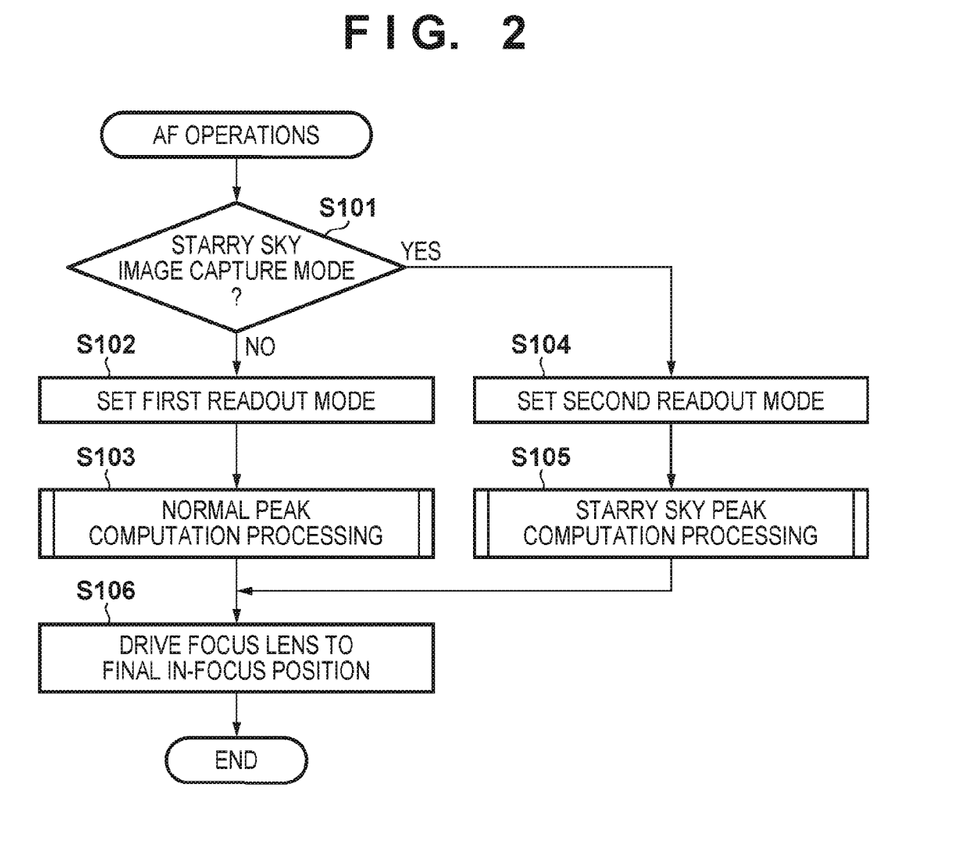
FIG. 2 is a flowchart illustrating an overview of AF operations performed by a digital camera according to an embodiment.

FIG. 2 is a flowchart illustrating operations in an AF process carried out by the digital camera 100 according to the present embodiment. As described above, the AF operations are started in response to the input of an instruction to start the capturing preparation operations.

In S101, the control unit 107 determines whether or not the "starry sky image capture mode" is selected by the mode dial 1041. Although it is assumed here that the mode dial 1041 is capable of selecting the "starry sky image capture mode" and a "normal mode", other image capture modes may be selectable as well.

Furthermore, although the present embodiment describes a case where the image capture mode is set by manipulating the mode dial 1041, the image capture mode may be set using a switch, a button, a touch panel, a voice command, or the like rather than the mode dial 1041. The mode selection is also not limited to a setting made by an operator, and a configuration may be employed in which the digital camera 100 sets the mode in accordance with a scene recognition result obtained using a known method, for example. For example, the configuration may be such that a region in which point light sources (small subjects with high luminance) are scattered throughout a dark background, as with a starry sky scene, is the dominant scene is automatically determined using a luminance histogram, for example.

A starry sky scene is a common example of a scene having low luminance and contrast, but the present invention is not absolutely limited to cases where a starry night scene is captured. The effects of the present invention can basically be fully realized in a scene in which a region where point-shaped (low area) high-luminance subjects are scattered throughout a low-luminance background occupies no less than a predetermined percentage (no less than half, for example) of the screen or the focus detection region. A night scene is another example aside from a starry sky scene.

The control unit 107 (a selection unit) advances the processing to S104 in the case where it is determined in S101 that the "starry sky image capture mode" is selected, and advances the processing to S102 in the case where the "starry sky image capture mode" is not selected, or in other words, in the case where the "normal mode" is selected. In the normal mode, focus detection is carried out in a second focus detection mode, whereas in the starry sky image capture mode, focus detection is carried out in a first focus detection mode.

Operations performed in the second focus detection mode will be described first.

In S102, the control unit 107 sets the TG 111 so that the image sensor 103 readout is carried out in a first readout mode, which obtains an image signal having a lower resolution than the spatial resolution of the image sensor 103. The first readout mode executes an adding process that adds three pixels at a time of the same color adjacent to each other in the readout (horizontal) direction of the image sensor 103, and a thinning process that reads out every third line in a direction orthogonal to the readout direction (vertical) (that is, reads out one line and skips two lines). The number of read-out pixels in both the horizontal and vertical directions is thus reduced to ⅓ in the first readout mode, and the readout time can be shortened and the frame rate increased as a result.

Figure 3:
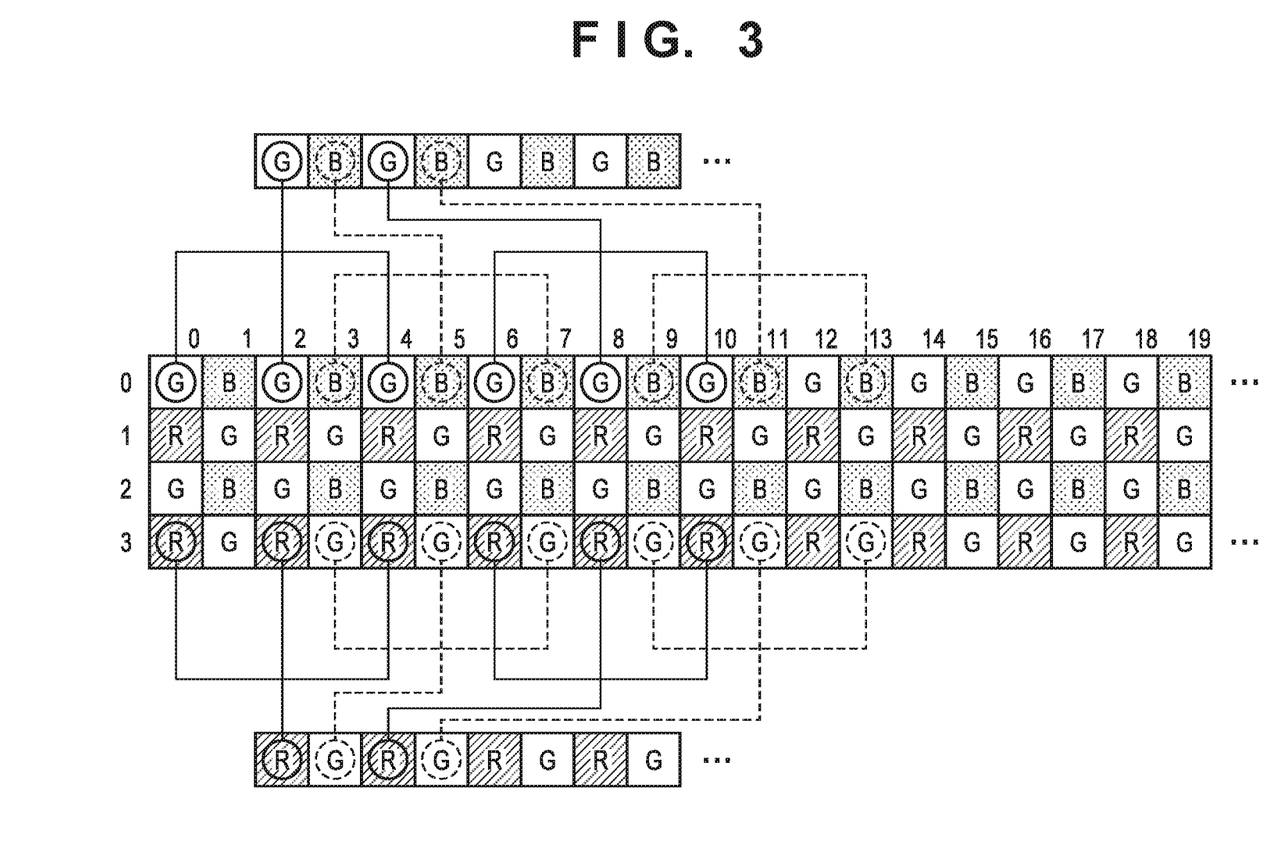
FIG. 3 is a diagram illustrating an overview of a first readout mode according to an embodiment.

FIG. 3 schematically illustrates a relationship between four lines and 20 columns of the pixel array in the image sensor 103, and the pixels read out in the first readout mode. The first readout mode carries out thinning by reading out one line and skipping two lines. It is assumed here that 3×Mth lines (where M is an integer greater than or equal to 0) are to be read out. As such, in FIG. 3, the 0th and third lines are read out and the first and second lines are skipped through the thinning.

Meanwhile, when three of the same color pixels are added and read out in the horizontal direction, if the 0th line is taken as an example, signals of the G (green) pixels in the 0th, second, and fourth columns are added (averaged) in the image sensor 103 and read out. Likewise, the signals of three B (blue) pixels in the third, fifth, and seventh columns are added and read out. The B (blue) pixels in the first column are excluded from the adding so that the positions of center pixels in the groups of pixels added are located at equal intervals. The readout of the R (red) pixels and G (green) pixels in the third line is the same as in the 0th line, and the G pixels in the first column are excluded from the adding.

In S103, the control unit 107 carries out the normal peak computation process for finding a focus lens position where the AF evaluation value is at a peak, by controlling the signal processing unit 105, the evaluation value computation unit 106, the drive control unit 109, and the like. The normal peak computation process will be described in detail later. The control unit 107 advances the processing to S106 once the normal peak computation process is complete.

Operations performed in the first focus detection mode will be described next.

In S104, the control unit 107 sets the TG 111 so that the image sensor 103 readout is carried out in a second readout mode. The second readout mode does not execute the adding process for pixels in the readout (horizontal) direction of the image sensor 103 nor the thinning process in the direction orthogonal to the readout direction (vertical). Neither the adding process nor the thinning process are carried out in the second readout mode, and thus a signal having the same resolution as the spatial resolution of the image sensor 103 can be read out.

Point light sources such as stars have high signal intensities but occupy little space in the image, and thus applying a pixel addition (averaging) process to a starry sky scene or a night scene can result in a drastic drop in the signal intensities of the point light sources. A thinning process, meanwhile, can result in images of stars not being read out at all. Although starry sky scenes and night scenes, where point light sources are scattered throughout a dark background, have a characteristic of high signal intensities in high-frequency bands being present, this characteristic can change due to the pixel adding process or thinning process and affect the accuracy of contrast-based AF. To avoid this phenomenon, neither the additive readout nor the thinning are carried out in the second readout mode.

Accordingly, in the case where the "starry sky image capture mode" is selected in the present embodiment, the second readout mode that executes neither the pixel adding nor the thinning is set in order to enable high spatial frequency components, high signal intensities, and so on of star images to be employed in the AF processing. However, additive readout, thinning, and so on may be carried out in the second readout mode in the case where the number of pixels that form point light sources is greater than a set number, as a result of future advances in optical zoom performance, extreme reductions in pixel pitches in image sensors, and so on.

In S105, the control unit 107 carries out the starry sky peak computation process for finding a focus lens position where the AF evaluation value is at a peak, by controlling the signal processing unit 105, the evaluation value computation unit 106, the drive control unit 109, and the like. The starry sky peak computation process will be described in detail later. The control unit 107 advances the processing to S106 once the starry sky peak computation process is complete.

In S106, the control unit 107 uses the drive control unit 109 to move the focus lens 102 to a final in-focus position on the basis of the peak position computed in S103 or S105, and then ends the AF processing.

Normal Peak Computation Process

Figure 4:
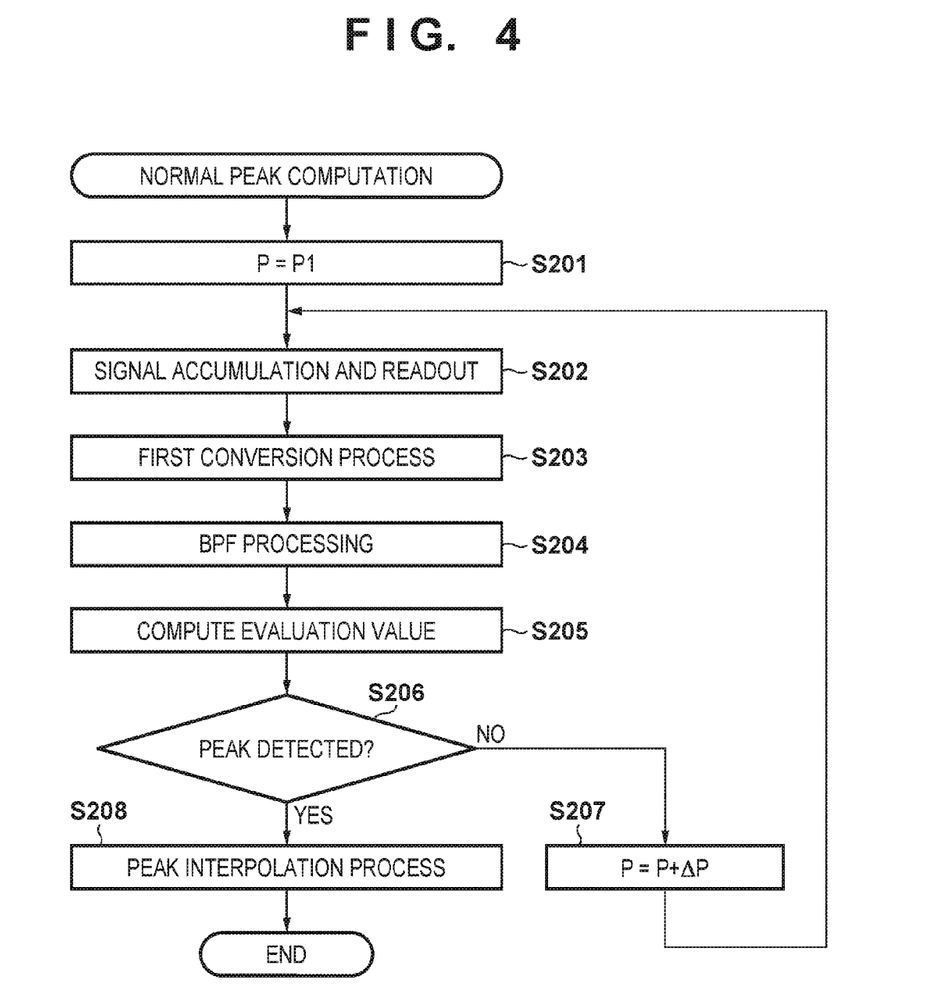
FIG. 4 is a flowchart illustrating in detail a normal peak computation process according to the embodiment.

Next, the normal peak computation process of S103 in FIG. 2 will be described in detail using the flowchart in FIG. 4.

In S201, the control unit 107 sets a position P of the focus lens 102 to an initial value (a drive start position) in the drive control unit 109. Although it is assumed here that a position P1 of the focus lens 102 at the start of the AF processing (at the start of the processing illustrated in FIG. 2) is set as the initial value, a specific position may be set as the initial value instead. Note that during the AF process, the focus lens 102 is driven by a predetermined unit distance (or scan step) ΔP.

In S202, the image sensor 103 accumulates charges, and signals are read out therefrom. The charge accumulation period is determined and controlled by the control unit 107 on the basis of a frame rate, image luminance information, and so on. The first readout mode is set when the normal peak computation process is executed; thus the TG 111 generates readout signals for the additive readout in the horizontal direction and the thinning readout in the vertical direction, and supplies those signals to the image sensor 103. The read-out signals (image data) are input into the signal processing unit 105 and the intensity detection unit 108.

In S203, the intensity detection unit 108 detects the signal intensity of each color component on the basis of image data corresponding to a pre-set focus detection region in the image data read out in S202 and computes a coefficient for correcting a signal intensity difference between the color components (a white balance coefficient). Then, using the white balance coefficient, the signal processing unit 105 carries out a first conversion process on the image data read out in S202. The first conversion process will be described in detail later, along with a detailed description of a second conversion process.

In S204, the signal processing unit 105 (an extraction unit) executes a band pass filter (BPF) process on the image data obtained from the conversion process. Specifically, the signal processing unit 105 applies a spatial low-pass filter with a coefficient [1 2 1] in the line direction of the image data, and then further applies a spatial high pass (differential) filtering process with a coefficient [1-1]. Assuming the image sensor 103 is provided with a primary color Bayer pattern color filter, the spatial high pass filtering process obtains values in which a difference between adjacent green and red pixel values or a difference between adjacent green and blue pixel values is enhanced. These filters are merely examples, and filters with other coefficients may be employed as well. In addition, the configuration may be such that the filter is selected dynamically in accordance with the frequency characteristics of the subject. The signal processing unit 105 saves peak values obtained from the band pass filtering process for each line.

In S205, the evaluation value computation unit 106 adds one frame's worth of peak values saved by the signal processing unit 105 in S204, and computes the AF evaluation value.

In S206, the control unit 107 compares a previous evaluation value, computed for the previous focus lens position P (a position shifted from the current position by the unit distance), with a current evaluation value, computed for the current focus position P (the current position). Then, in the case where a change between the adjacent evaluation values has switched from increasing to decreasing and an amount of decrease from the previous evaluation value to the current evaluation value is greater than a predetermined value, the control unit 107 determines that a peak has been detected, and advances the processing to S208.

On the other hand, the control unit 107 advances the processing to S207 in the case where it is determined that a peak has not been detected. The previous evaluation value does not exist the first time S206 is executed, and thus the control unit 107 advances the processing to S207 in this case. In S207, using the drive control unit 109, the control unit 107 moves the focus lens 102 to a position shifted toward the near end (i.e., a position in the direction for shortening the in-focus distance) from the current position by the unit distance ΔP (P+ΔP), and then returns the processing to S202. However, the direction in which the focus lens 102 is driven from the initial position is not limited to being toward the proximal side, and may be toward the infinity end (i.e., the direction for lengthening the in-focus distance). In this manner, the AF evaluation value computation and comparison are repeatedly executed while moving the focus lens 102 gradually toward the near end until a peak is detected in S206.

In S208, the control unit 107 carries out an interpolation operation using a predetermined number of (for example, three to four) evaluation values including the current evaluation value at which the peak has been detected in order to determine a focus lens position corresponding to the evaluation value peak (a peak position) at an accuracy corresponding to less than the unit distance ΔP, and then ends the processing. However, a method aside from an interpolation operation, such as polynomial approximation based on a greater number of evaluation values, may be used as well.

The foregoing has described a configuration in which it is determined whether or not a peak has been detected in S206 and the focus lens 102 is not driven after the peak has been detected. However, the driving of the focus lens 102 and the computation of the evaluation value may be continued even after it has been determined that a peak has been detected until the focus lens 102 reaches a drive end position.

Starry Sky Peak Computation Process

Figure 5:
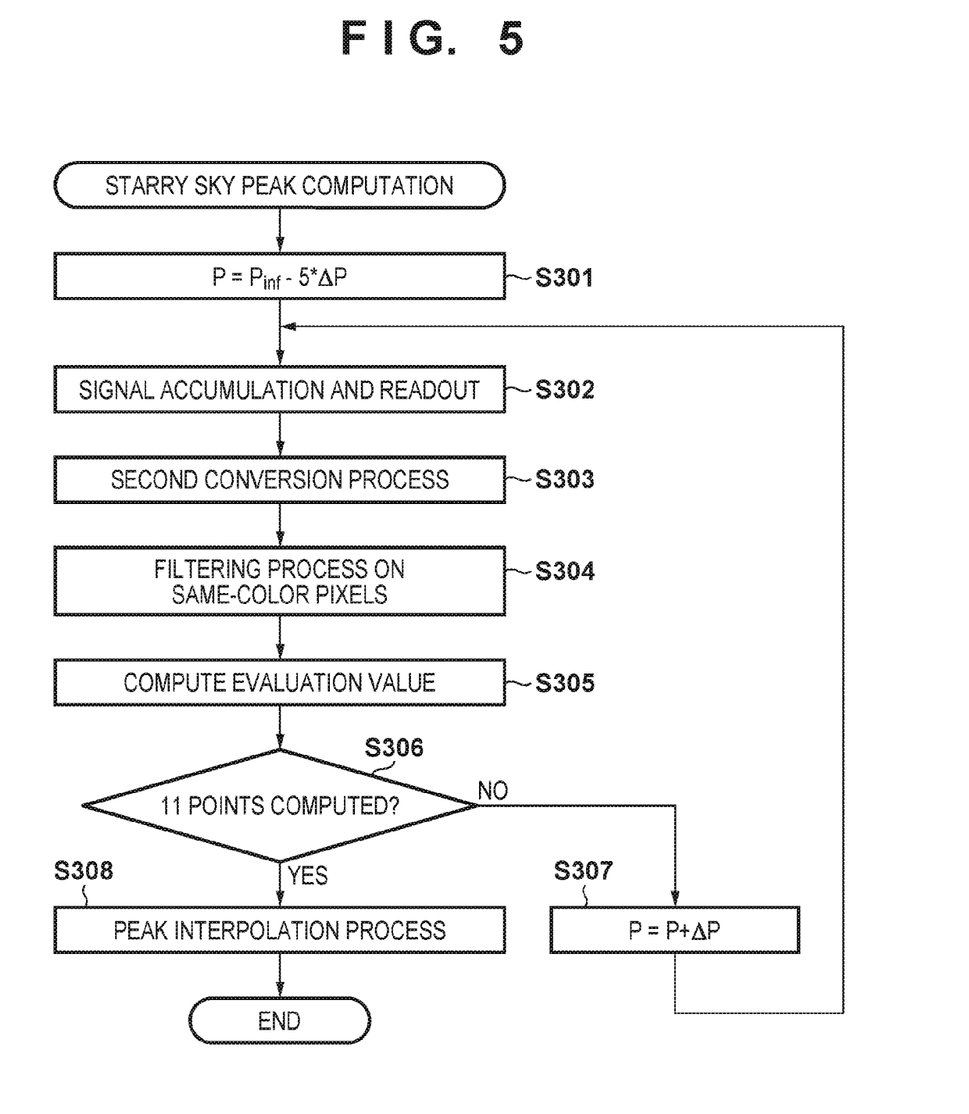
FIG. 5 is a flowchart illustrating in detail a starry sky peak computation process according to the embodiment.

Next, the starry sky peak computation process of S105 in FIG. 2 will be described in detail using the flowchart in FIG. 5.

In S301, the control unit 107 sets a position P of the focus lens 102 to an initial value (a drive start position) in the drive control unit 109. Here, the position is set to a position moved further toward the infinity end, by an amount equivalent to five times the unit distance ΔP by which the focus lens 102 is driven, from an adjusted infinity position ($P_{inf}$) adjusted as an infinity position during the process of manufacturing the digital camera 100. Note that another position, such as an estimated infinity position obtained by correcting the adjusted infinity position for temperature or orientation changes, may be used instead of the adjusted infinity position.

In S302, the image sensor 103 accumulates charges, and signals are read out therefrom. The charge accumulation period is determined and controlled by the control unit 107 on the basis of a frame rate, image luminance information, and so on. The second readout mode is set when the starry sky peak computation process is executed; thus the TG 111 generates readout signals for not carrying out the pixel adding in the horizontal direction and the thinning in the vertical direction, and supplies those signals to the image sensor 103. The read-out signals (image data) are input to the signal processing unit 105 and the intensity detection unit 108.

In S303, the intensity detection unit 108 detects the signal intensity of each color component on the basis of image data corresponding to a pre-set focus detection region in the image data read out in S302 and computes a common coefficient for the respective color components. Furthermore, using the computed coefficient, the signal processing unit 105 carries out the second conversion process on the image data read out in S302. This will be described in greater detail later.

In S304, the signal processing unit 105 (extraction unit) carries out a filtering process on same-color pixels in the image data obtained from the conversion process. Specifically, the signal processing unit 105 applies a spatial high pass (differential) filtering process with a coefficient [1 0 −1] in the line direction of the image data.

Although the spatial high pass filter applied in the band pass filtering process of the normal peak computation process (S204) has two coefficients, a three-coefficient filter having 0 as a coefficient for the processing target pixel is used in the starry sky peak computation process. The image sensor 103, which has a Bayer pattern color filter, is used in the present embodiment, and thus the same color pixel is present every two pixels in the horizontal direction and the vertical direction. Accordingly, a difference between the values of two same-color pixels (pixels having the same color component) adjacent on the left and right of the processing target pixel is found by using a filter with a coefficient [1 0 −1]. These filters are merely examples, and filters with other coefficients that handle same-color pixels may be used as well. Furthermore, a band pass filtering process that applies a low-pass filter to same-color pixels may be carried out before the high pass filtering process. In addition, the configuration may be such that the filter is selected dynamically in accordance with the frequency characteristics of the subject. The signal processing unit 105 saves peak values obtained from the filtering process for each line.

When taken alone, the high pass filter used in the starry sky peak computation process has a characteristic of leaving more low-frequency components. However, the second readout mode is used for image data read out without performing additive readout in the horizontal direction, and can therefore extract signals in a higher frequency band than the band pass filtering process in the normal peak computation process that carries out additive readout.

In S305, the evaluation value computation unit 106 adds one frame's worth of peak values saved by the signal processing unit 105 in S304, and computes the AF evaluation value.

In S306, the control unit 107 determines whether evaluation values have been computed for a predetermined number of focus lens positions (11 is used as an example here); the process moves to S308 when the predetermined number of evaluation values has been computed, and moves to S307 in the case where the predetermined number of evaluation values has not been computed.

In S307, using the drive control unit 109, the control unit 107 moves the focus lens 102 to a position shifted toward the near end from the current position by the unit distance ΔP (P+ΔP), and then returns the processing to S302. However, the direction in which the focus lens 102 is driven from the initial position is not limited to being toward the near end, and may be toward infinity. In this manner, the AF evaluation value computation is repeatedly executed while moving the focus lens 102 gradually toward the near end until it has been determined that a predetermined number of AF evaluation values have been computed in S306.

In S308, the control unit 107 carries out an interpolation operation using a predetermined number of (for example, three to four) sequentially-computed evaluation values including the maximum evaluation value in order to determine a focus lens position corresponding to the evaluation value peak (a peak position) at an accuracy corresponding to less than the unit distance ΔP, and then ends the processing. However, a method aside from an interpolation operation, such as polynomial approximation based on a greater number of evaluation values, may be used as well.

Details of Conversion Processes

The first and second conversion processes executed in S203 of FIG. 4 and S303 of FIG. 5 will now be described in detail.

Figure 6A:
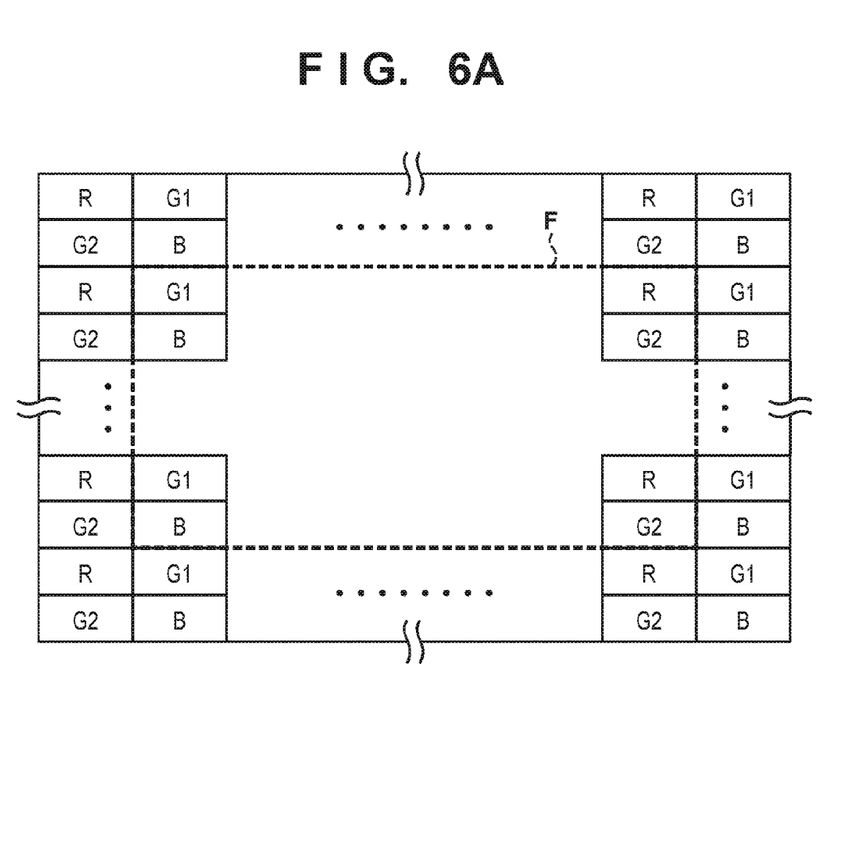
FIGS. 6A and 6B are diagrams illustrating examples of a pixel array and a focus detection region according to an embodiment.
Figure 6B:
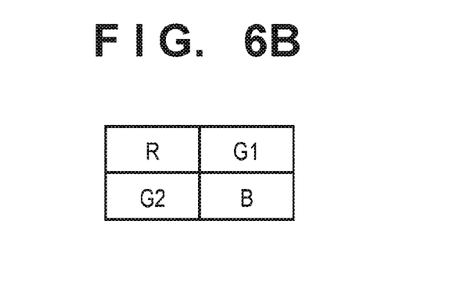

FIG. 6A schematically illustrates a pixel array in a predetermined focus detection region F and a region corresponding to the vicinity thereof in the image sensor 103. As described above, the image sensor 103 according to the present embodiment is provided with a primary color Bayer pattern color filter having the repeating pattern illustrated in FIG. 6B. In FIGS. 6A and 6B, R indicates red, G1 and G2 indicate green, and B indicates blue. G1 and G2 may be referred to collectively as G hereinafter.

The intensity detection unit 108 computes a white balance coefficient on the basis of the values (signal intensities) of the respective color components (R, G, and B) of image data read out from a region corresponding to the focus detection region F in the image sensor 103. The white balance coefficient is a gain (amplification rate) for adjusting the signal intensities among the color components.

First, a process for computing a white balance coefficient used in both the first and second conversion processes will be described.

The intensity detection unit 108 handles the image data read out from the image sensor 103 in units of pixel blocks corresponding to the repeating pattern indicated in FIG. 6B (called "basic blocks" hereinafter). The intensity detection unit 108 computes color evaluation values Cx and Cy for each of the basic blocks on the basis of Formula 1, indicated below. In Formula 1, R, G1, G2, and B represent the values (signal intensities) of the corresponding pixels within the basic blocks.

$$C\_x = ((R+G2)-(B+G1))/Y\_i$$

$$C\_y = ((R+B)-(G1+G2))/Y\_i$$

$$Y\_i = (R+G1+G2+B)/4 \qquad \text{Formula 1}$$

Figure 7:
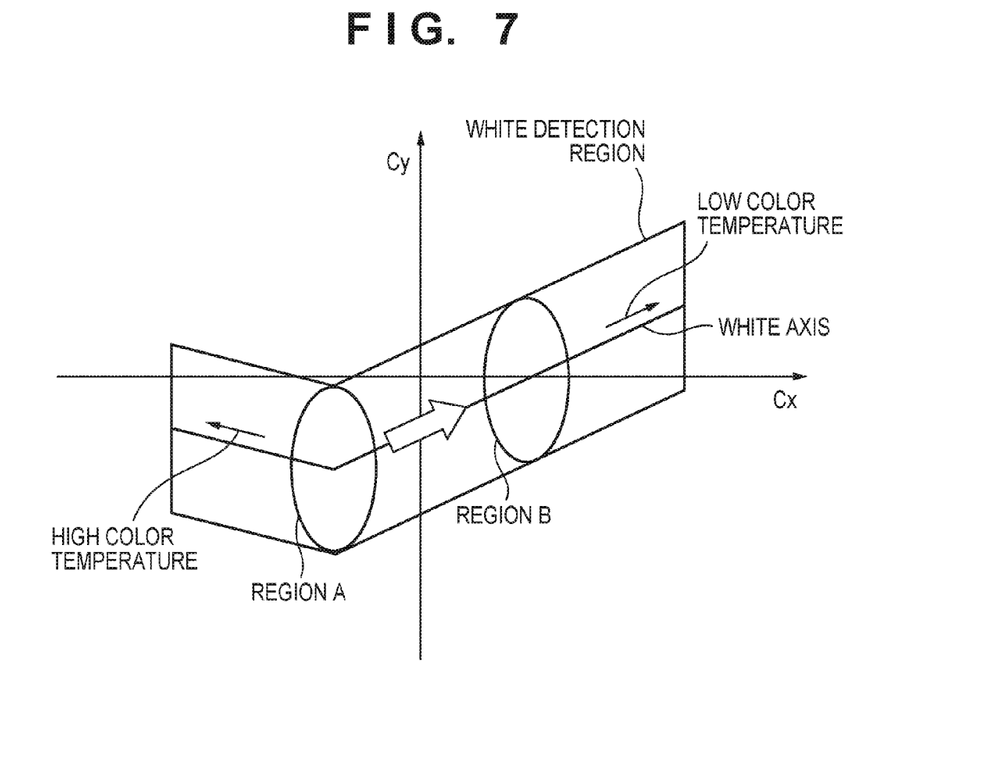
FIG. 7 is a diagram illustrating an example of a white detection region used to compute a white balance coefficient according to an embodiment.

FIG. 7 is a diagram illustrating a color space, where the horizontal axis represents Cx and the vertical axis represents Cy. FIG. 7 also indicates a white axis defined from the color evaluation values Cx and Cy computed from images in which white has been captured from a high color temperature to a low color temperature in advance. However, a slight amount of variation will be present in the color evaluation value for white under an actual light source.

For example, the color evaluation value for white under a high color temperature light source such as sunlight is distributed throughout a range indicated as a region A. On the other hand, the color evaluation value for white under a low color temperature light source such as a white tungsten lamp is distributed throughout a range indicated as a region B. Accordingly, a range provided with a width centered on the white axis serves as a white detection region (a region that should be detected as white).

Of the basic blocks, the intensity detection unit 108 determines blocks whose computed color evaluation values Cx and Cy are present within the white detection region of the color space indicated in FIG. 7 to be white blocks. The intensity detection unit 108 integrates the pixel values that constitute the basic blocks within the focus detection region F determined to be white blocks on a color component-by-color component basis in order to compute integrated values SumR, SumG1, SumG2, and SumB. Then, from the number of pixels integrated (=a white block number) N, the intensity detection unit 108 computes average values AveR, AveG1, AveG2, and AveB of each color component in the white block and an average value AveYi of the luminance, on the basis of the following Formula 2.

$AveR = SumR/N$ $AveG1 = SumG1/N$ $AveG2 = SumG2/N$ $AveB = SumB/N$ $AveY\_i = (SumR + SumG1 + SumG2 + SumB)/4*N$     Formula 2

Next, the intensity detection unit 108 computes white balance coefficients kWB_R, kWB_G1, kWB_G2, and kWB_B corresponding to the signal intensities R, G1, G2, and B of each color component, on the basis of the following Formula 3.

$kWB\_R = (AveY\_i)/AveR$ $kWB\_G1 = (AveY\_i)/AveG1$ $kWB\_G2 = (AveY\_i)/AveG2$ $kWB\_B = (AveY\_i)/AveB$     Formula 3

As can be seen from Formula 3, the white balance coefficient kWB for each color component is a value obtained by dividing an average signal intensity AveY_i of all of the pixels within the white blocks present in the focus detection region F by an average signal intensity of the corresponding color component within the white blocks. As such, the coefficient is lower for color components whose signal intensities within the white blocks are strong, and is higher for color components whose signal intensities are weak.

By multiplying the white balance coefficient kWB by the value of the pixel data of the corresponding color component, the signal processing unit 105 can generate luminance signals in which the signal intensities of all the pixels within the image have a uniform value based on white, or in other words, in which there is little variation between adjacent pixels. In this manner, the first conversion process is a process that applies a white balance coefficient computed on the basis of the image data within the focus detection region.

The second conversion process will be described next.

The second conversion process takes the white balance coefficients computed by the intensity detection unit 108 in the first conversion process, and from those further computes a common coefficient for the color components; that coefficient is then applied by the signal processing unit 105. In other words, in the case where the starry sky image capture mode is set, a single coefficient is further computed from all of the white balance coefficients kWB_R, kWB_G1, kWB_G2, and kWB_B indicated in Formula 3, and that coefficient is then applied to the image data.

It is assumed here that AveWB, which is an average value of the white balance coefficients kWB_R, kWB_G1, kWB_G2, and kWB_B, is computed as the common coefficient for the color components. In this manner, a coefficient that does not depend on the color component is used in order to suppress noise components in a specific color component particularly in dark regions from being greatly amplified by applying the white balance coefficient.

Starry skies, night scenes, and so on contain a high amount of low-luminance background regions (night sky). Meanwhile, as described above, the white balance coefficients computed in the first conversion process are greater in color components having weaker signal intensities within the white blocks. As such, when a color component having a low value is present, that color component is amplified using an extremely high white balance coefficient, which causes the noise component to be needlessly amplified. When contrast-based AF is then carried out using the image whose noise component has been amplified, a pseudo-edge component produced by the amplified noise increases the AF evaluation value and results in a drop in the accuracy of the AF. This problem is not limited to contrast-based AF, and also causes a drop in the accuracy of image plane phase difference-based AF, for example.

In the case where many low-luminance regions are thought to be present in an image, the influence of noise components in the signal intensity of each color component can be thought to be greater. Furthermore, in the case where the image data is read out without adding pixels in the horizontal direction, thinning pixels in the vertical direction, and so on, the influence of random noise that would be reduced by the pixel adding and thinning remains as-is in the low-luminance regions of the read-out image data, which exacerbates this problem.

Accordingly, in the present embodiment, a fixed coefficient that does not depend on the signal intensity of the color component is used in the case where the starry sky image capture mode is set, suppressing the above-described amplification of unnecessary noise components and suppressing a drop in the AF accuracy.

The present embodiment has described a configuration in which a coefficient common for all color components is used in the second conversion process as a typical example. However, the effect of suppressing the noise component from being amplified can also be obtained if coefficients having less variation than the white balance coefficients for the individual color components as computed in the first conversion process are used. Accordingly, in the case where an absolute value of a difference between the maximum value and the minimum value of kWB_R, kWB_G1, kWB_G2, and kWB_B is represented by $\alpha$, for example, kWB_R, kWB_G1, kWB_G2, and kWB_B may be corrected so as to take on a value in a range of $AveWB \pm \beta$ (where $\beta < \alpha/2$). Furthermore, although the coefficient used in the second conversion process is described here as being computed using the white balance coefficients computed in the same manner as in the first conversion process, that coefficient need not be computed. In this case, a predetermined coefficient may be applied, the coefficient may not be applied at all, and so on.

Filter Characteristics

Next, differences and the effects thereof in the filters used in the filtering processes in the normal peak computation process and the starry sky peak computation process will be described.

Figure 8A:
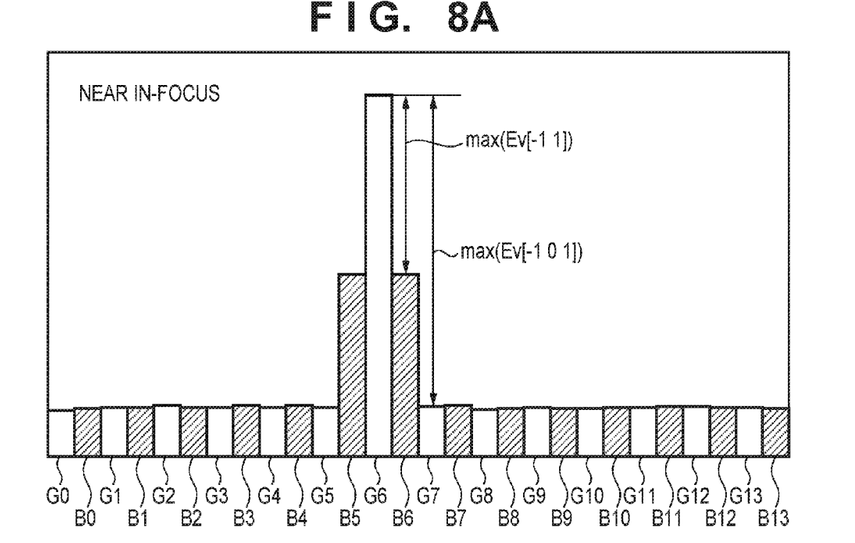
FIGS. 8A and 8B are schematic diagrams illustrating a difference between filters used in S204 of FIG. 4 and S304 of FIG. 5.
Figure 8B:
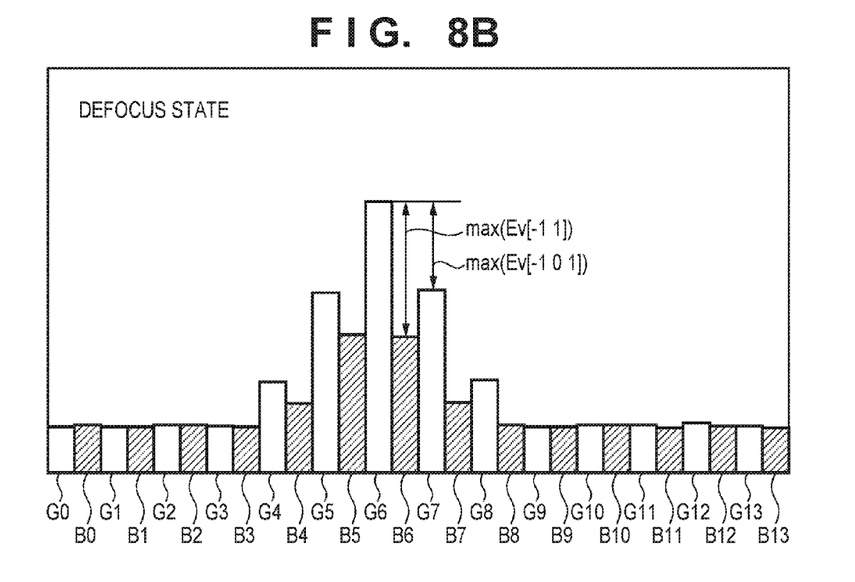

FIGS. 8A and 8B are diagrams schematically illustrating a relationship between the signal intensities (pixel values) in an image obtained by capturing a starry sky in the starry sky image capture mode, and a focus state level. These drawings illustrate signal intensities (pixel values) in a near in-focus state (FIG. 8A) and a defocus state or out-of-focus state (FIG. 8B), for 28 pixels in a pixel line constituted of G pixels and B pixels. G0 to G13 represent G pixels, B0 to B13 represent B pixels, and the vertical axis represents the pixel value.

A single star is visible in this pixel line, and is formed in B5, G6, and B6 in the near in-focus state (that is, a state that is almost in-focus). Image contours soften in the defocus state (a blurry state), and thus the image is spread throughout more pixels than in the near in-focus state (from B4 to B7).

In a typical embodiment, the coefficient applied in the starry sky image capture mode has a fixed value, and thus even if the same level of white light is incident on the G pixels and the B pixels, the signal intensities thereof will differ due to a difference in transmittance caused by the colors of the color filters. This difference appears in the defocus state as a difference in the signal intensities between the G pixels (G5 and G7, for example) and the B pixels (B5 and B6, for example).

As described above, different high pass filters are used in the filtering processes in the starry sky peak computation process and the normal peak computation process. Specifically, a [−1 1] differential filter is used in the normal peak computation process, and a [−1 0 1] differential filter is used in the starry sky peak computation process.

Applying a [−1 1] differential filter is equivalent to an operation for finding a differences between the adjacent pixel values of different colors. As such, the maximum absolute value of the values obtained through the filtering process is obtained between B5-G6 or between G6-B6 (max(Ev[−1 1]) in the drawings).

On the other hand, applying a [−1 0 1] differential filter is equivalent to an operation for finding a difference between adjacent pixel values of the same color, and thus the maximum absolute value of the values obtained through the filtering process is obtained between G5-G6 or between G6-G7 (max(Ev[−1 0 1]) in the drawings).

Comparing FIGS. 8A and 8B, it can be seen that although the positions where max(Ev[−1 0 1]) and max(Ev[−1 1]) are obtained are the same in both the near in-focus state and the defocus state, the magnitude relationship therebetween is reversed.

In other words,
in the near in-focus state:

max(*Ev*[−1 0 1])>max(*Ev*[−1 1])

whereas in the defocus state:

max(*Ev*[−1 0 1])<max(*Ev*[−1 1])

As described above, the AF evaluation value is an integrated value of the maximum absolute values in each pixel line obtained in the filtering process. As such, applying the [−1 0 1] differential filter in the near in-focus state obtains a higher AF evaluation value than applying the [−1 1] differential filter. On the other hand, applying the [−1 1] differential filter in the defocus state obtains a higher AF evaluation value than applying the [−1 0 1] differential filter.

In other words, if the [−1 1] differential filter is used in the high pass filtering process of the second conversion process, the AF evaluation value will be lower in the near in-focus state and the AF evaluation value will be higher in the defocus state than in the case where the [−1 0 1] differential filter is used. To rephrase, using the [−1 1] differential filter results in a lower difference between AF evaluation values among different states of focus than using the [−1 0 1] differential filter.

The accuracy of the peak interpolation process (S208, S308) for finding the final focus position depends on the magnitude (sharpness) of the difference in AF evaluation values relative to changes in the state of focus. Accordingly, using the [−1 0 1] differential filter makes it possible to achieve a higher accuracy in the peak interpolation process than when using the [−1 1] differential filter.

As described thus far, the digital camera according to the present embodiment has an operating mode that carries out automatic focus detection on the basis of an image signal having a resolution equivalent to the spatial resolution of the image sensor, without adding, thinning, or the like. In this operating mode, at least one of the following is executed: the signals used in the automatic focus detection are generated without correcting for signal intensity differences between color components in the image signal; and the signals used in the automatic focus detection are generated having extracted a specific frequency component of the image signal through an operation using values of same-color (same color component) pixels. Carrying out the automatic focus detection in such an operating mode makes it possible to improve the accuracy of focus detection when capturing a subject having low luminance, low contrast, or the like.

Variations

Although the foregoing embodiment describes using contrast-based AF, the configuration may use image plane phase difference-based AF that detects a defocus amount and direction from a phase difference between a pair of image signals corresponding to different exit pupils. In this case, a pair of image signals are generated from the image signal in the starry sky image capture mode, and the phase difference (correlation) between the image signals is detected after the filtering processes have been applied. The white balance processing may then be omitted before generating the image signals, a differential filter applied to adjacent pixels of the same color may be used in the filtering process, and so on.

A known configuration of an image sensor for realizing image plane phase difference-based AF, a known method for generating the image signals, and a known method for detecting the defocus amount, such as those disclosed in Japanese Patent Laid-Open No. 2001-250931, for example, can be used, and thus detailed descriptions thereof will be omitted here.

Other Embodiments

Although exemplary embodiments of the present invention has been described here, the present invention is not limited to the configurations described in the foregoing embodiments, and many variations and changes can be made thereon. All variations and changes that fall within the scope of the appended claims are considered to be included in the present invention.

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102274, filed on May 19, 2015, which is hereby incorporated by reference herein in its entirety.

What is claimed is:

1. An image capture apparatus comprising:
an obtainment unit configured to obtain an image signal from an image sensor;
a computation unit configured to compute a coefficient for correcting an intensity difference between color components of the image signal;
an extraction unit configured to extract a specific frequency component from the image signal; and
a focus detection unit configured to carry out focus detection on the basis of the extracted specific frequency component,
wherein in a first focus detection mode, the extraction unit extracts the specific frequency component from the image signal without applying the coefficient computed by the computation unit or the image signal having applied a coefficient having a smaller difference between color components than the coefficient computed by the computation unit, and
in a second focus detection mode, the extraction unit extracts the specific frequency component from the image signal having applied the coefficient computed by the computation unit.

2. The image capture apparatus according to claim 1, wherein in the first focus detection mode, the extraction unit extracts the specific frequency component from the image signal without applying the coefficient computed by the computation unit or through an operation using the values of pixels of the same color component in the image signal to which a coefficient having a smaller difference between color components than the coefficient computed by the computation unit has been applied.

3. The image capture apparatus according to claim 1, wherein in the second focus detection mode, the extraction unit extracts the specific frequency component from the image signal through an operation using the values of pixels of different color components in the image signal to which the coefficient computed by the computation unit has been applied.

4. The image capture apparatus according to claim 1, wherein in the first focus detection mode, the computation unit does not compute the coefficient.

5. The image capture apparatus according to claim 1, wherein in the first focus detection mode, the extraction unit extracts the specific frequency component from an image signal to which a predetermined coefficient common for all color components is applied.

6. The image capture apparatus according to claim 1, wherein in the first focus detection mode:
the computation unit computes a coefficient common for all color components on the basis of the already-computed coefficient, and
the extraction unit extracts the specific frequency component from the image signal having applied the coefficient computed by the computation unit.

7. The image capture apparatus according to claim 1, wherein in the first focus detection mode:
the obtainment unit obtains an image signal having a resolution equal to a spatial resolution of the image sensor, and
the extraction unit extracts the specific frequency component from the obtained image signal.

8. The image capture apparatus according to claim 1, wherein in the second focus detection mode:
the obtainment unit obtains an image signal having a lower resolution than a spatial resolution of the image sensor, and
the extraction unit extracts the specific frequency component from the obtained image signal.

9. The image capture apparatus according to claim 1, further comprising:
a selection unit configured to select one of the first focus detection mode and the second focus detection mode in accordance with an image capture mode that has been set.

10. The image capture apparatus according to claim 9, wherein the image capture mode is set by a user.

11. The image capture apparatus according to claim 9, wherein the image capture mode is set as a result of scene recognition.

12. The image capture apparatus according to claim 9, wherein the image capture mode is an image capture mode for capturing a scene in which a region in which point-shaped high-luminance subjects are scattered throughout a low-luminance background occupies no less than a predetermined percentage of a screen or a focus detection region.

13. The image capture apparatus according to claim 9, wherein the image capture mode is an image capture mode for capturing a starry sky scene or a night scene.

14. A control method for an image capture apparatus, comprising:
obtaining an image signal from an image sensor;
computing a coefficient for correcting an intensity difference between color components of the image signal;
extracting a specific frequency component from the image signal; and
carrying out focus detection on the basis of the extracted specific frequency component,
wherein the extracting of the specific frequency component from the image signal includes:
in a first focus detection mode, extracting the specific frequency component from the image signal without applying the coefficient computed in the step of computing or from the image signal having applied a coefficient having a smaller difference between color components than the coefficient computed in the computing, and
in a second focus detection mode, extracting the specific frequency component from the image signal having applied the coefficient computed in the step of computing.

15. An image capture apparatus comprising:
an obtainment unit configured to obtain an image signal from an image sensor;
a computation unit configured to compute a coefficient for correcting an intensity difference between color components of the image signal;

an extraction unit configured to extract a specific frequency component from the image signal; and a focus detection unit configured to carry out focus detection on the basis of the extracted specific frequency component, wherein in a first focus detection mode, the extraction unit extracts the specific frequency component from the image signal without applying the coefficient computed by the computation unit or through an operation using the values of pixels of the same color component in the image signal to which a coefficient having a smaller difference between color components than the coefficient computed by the computation unit has been applied.

16. The image capture apparatus according to claim 15, wherein in a second focus detection mode, the extraction unit extracts the specific frequency component from the image signal having applied the coefficient computed by the computation unit.

17. A control method for an image capture apparatus, the method comprising:

obtaining an image signal from an image sensor;

computing a coefficient for correcting an intensity difference between color components of the image signal;

extracting a specific frequency component from the image signal; and carrying out focus detection on the basis of the extracted specific frequency component, wherein the extracting of the specific frequency component from the image signal includes extracting the specific frequency component from the image signal without applying the coefficient or through an operation using the values of pixels of the same color component in the image signal to which a coefficient having a smaller difference between color components than the coefficient has been applied.

* * * * *